United States Patent [19]

Wakou et al.

[11] 4,400,607

[45] Aug. 23, 1983

[54] EXCHANGING APPARATUS FOR WELDING JIG UNITS OF AN AUTOMATIC WELDING APPARATUS

[75] Inventors: Susumu Wakou; Satoshi Kadowaki, both of Sayama, Japan

[73] Assignee: Honda Giken Kogyo Kabushiki Kaisha, Tokyo, Japan

[21] Appl. No.: 268,571

[22] Filed: May 29, 1981

[30] Foreign Application Priority Data

May 30, 1980 [JP] Japan ................................ 55-73816
Jun. 19, 1980 [JP] Japan ............................ 55-82156[U]

[51] Int. Cl.³ ................................................ B23K 9/28

[52] U.S. Cl. .................................... 219/86.8; 29/568; 219/79

[58] Field of Search ...................... 219/86.8, 87, 69 R, 219/79; 29/568; 228/45; 104/99, 1 R; 105/177

[56] References Cited

U.S. PATENT DOCUMENTS

| | | | |
|---|---|---|---|
| 841,437 | 1/1907 | Pfautz | 104/99 |
| 3,012,517 | 12/1961 | Gale | 104/1 R X |
| 3,402,674 | 9/1968 | Tomita | 104/1 R |
| 3,707,921 | 1/1973 | Fort | 104/99 |
| 3,845,718 | 11/1974 | Rogers et al. | 105/177 X |
| 4,162,387 | 7/1979 | De Candia | 219/79 |
| 4,263,797 | 4/1981 | Cooper | 104/1 R X |

FOREIGN PATENT DOCUMENTS

| | | | |
|---|---|---|---|
| 55-73485 | 6/1980 | Japan | 219/86.8 |
| 1494514 | 12/1977 | United Kingdom | 104/1 R |

*Primary Examiner*—B. A. Reynolds
*Assistant Examiner*—Catherine Sigda
*Attorney, Agent, or Firm*—Armstrong, Nikaido, Marmelstein & Kubovcik

[57] ABSTRACT

An exchanging apparatus for exchanging welding jig units of an automatic welding apparatus on an assembly line. The automatic welding apparatus includes a combining station where a work to be assembled is combined and welded by detachable welding jig units, and a set carrier for moving the work along a conveying railway to and from the combining station. The exchanging apparatus comprises an exchanging railway which crosses the conveying railway through a switch mechanism and at least two exchanging carriers, each having thereon a gripping means for gripping a welding jig unit. Each of the above carriers is mounted on a plurality of wheels, each of which is turnable about a fixed vertical shaft on the respective carrier. The switch mechanism comprises turnable rail portions at the crossing points of the two railways, a rail fixing device for fixing the portions at their switched positions, and a carrier fixing device for positioning and fixing any one of the carriers while the rail portions are turned thereunder.

2 Claims, 9 Drawing Figures

EXCHANGING APPARATUS FOR WELDING JIG UNITS OF AN AUTOMATIC WELDING APPARATUS

BACKGROUND OF THE INVENTION

This invention relates to an exchanging apparatus for exchanging welding jig units in an automatic welding apparatus. Such welding apparatuses are used in an assembly line having a combining station for a work such as a motorcar body.

The motorcar body is conveyed to the combining station by a set carrier. The automatic welding apparatus is used for combining the component parts. The automatic welding apparatus is generally of the type wherein a welding jig unit thereof is detachable therefrom for exchanging.

It has been usual hitherto with this kind of welding apparatus that, because a welding jig unit is completely large in size, the operation for exchanging one jig with another is carried out by gripping and moving the jig unit with a fork lift, a crane or the like. Thus, the method of exchanging units is defective in that the exchanging operation is inefficient, especially when it is carried out at a narrow installation place and can be very unsafe.

This invention has been made to remove those defects and has for its object the provision of an apparatus wherein the exchanging of welding jig units can be facilitated by utilizing the railway which is normally used for conveying the work.

According to this invention, in an apparatus of the type that a combining station for combining a work conveyed to this station by a set carrier is provided aside the same with at least one automatic welding apparatus for welding the work, and the automatic welding apparatus is of the type that a welding jig unit thereof is detachable therefrom for exchanging, it is characterized in that a conveying railway for the set carrier is provided with an exchanging railway which crosses the conveying railway through a switch means. There are provided on the exchanging railway at least two exchanging carriers, each having thereon a gripping means for gripping a welding jig unit.

DETAILED DESCRIPTION OF THE PREFERRED EMBODIMENTS

Figure 1:
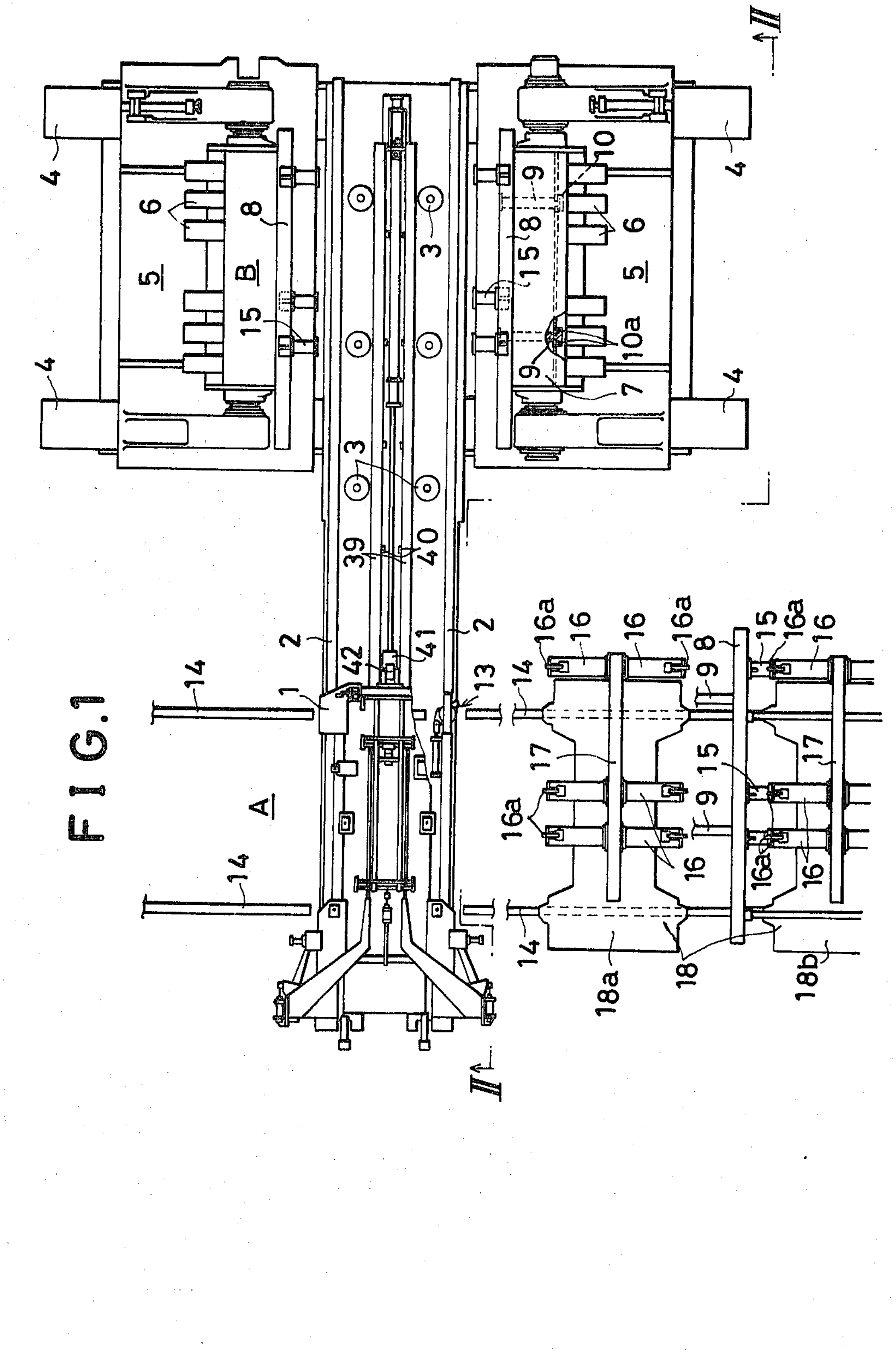
FIG. 1 is a top plan view, partially omitted, of one embodiment of the present invention.
Figure 2:
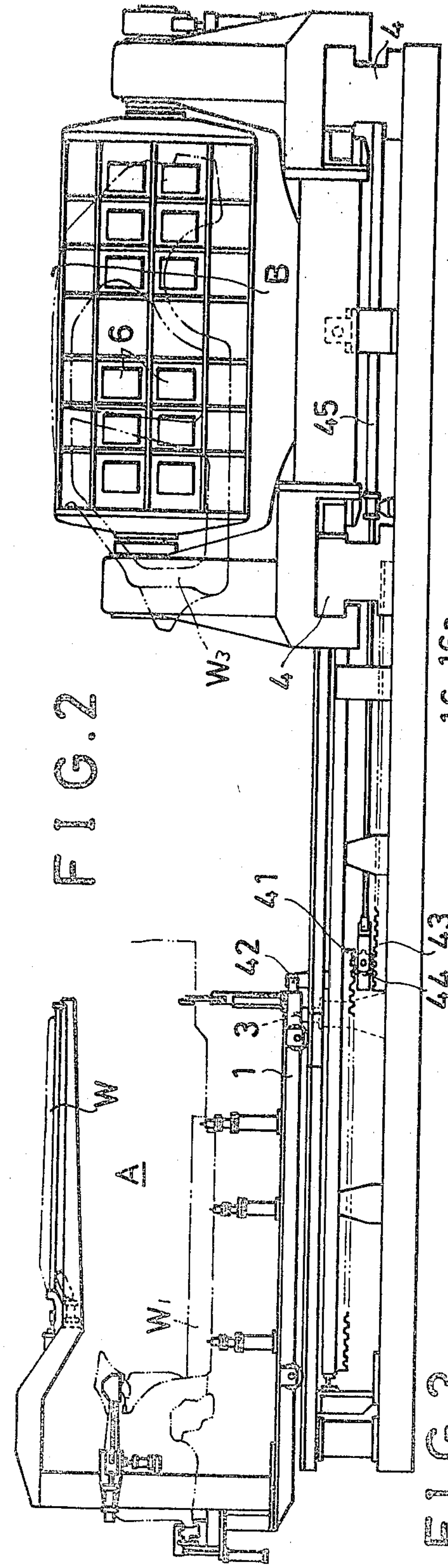
FIG. 2 is a side view thereof as viewed from the line II—II of FIG. 1.
Figure 3:
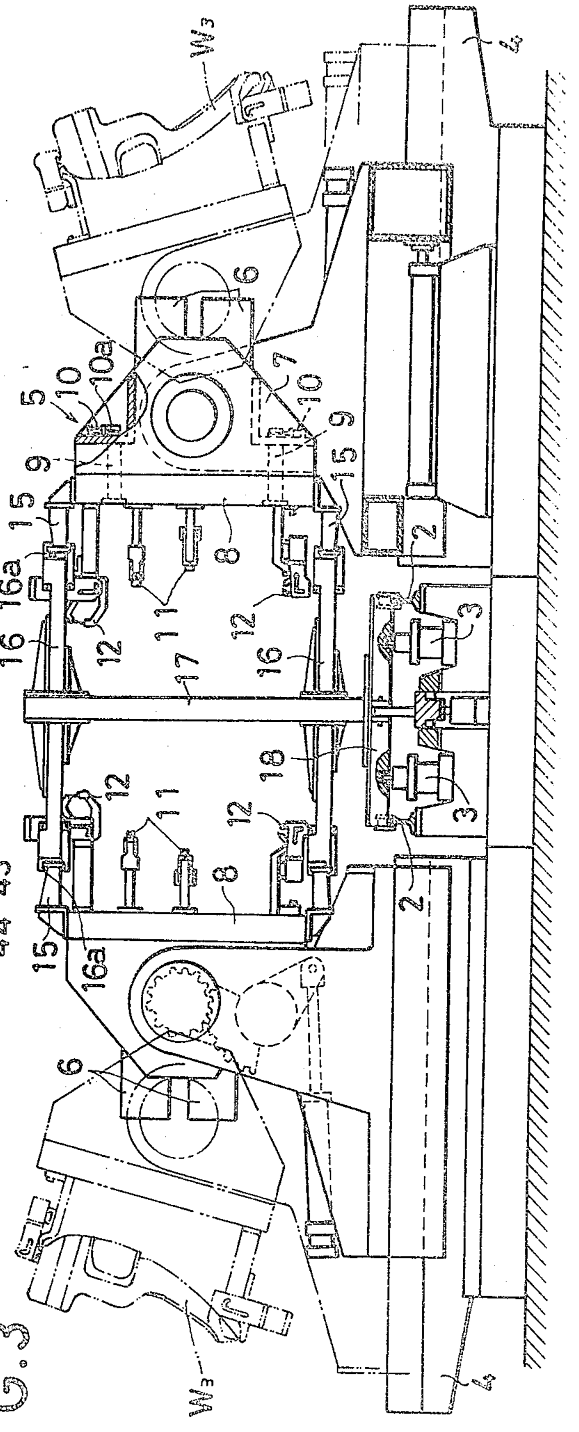
FIG. 3 is a front view, partly in section, of the same for showing an exchanging condition at a combining station.
Figures 4, 5:
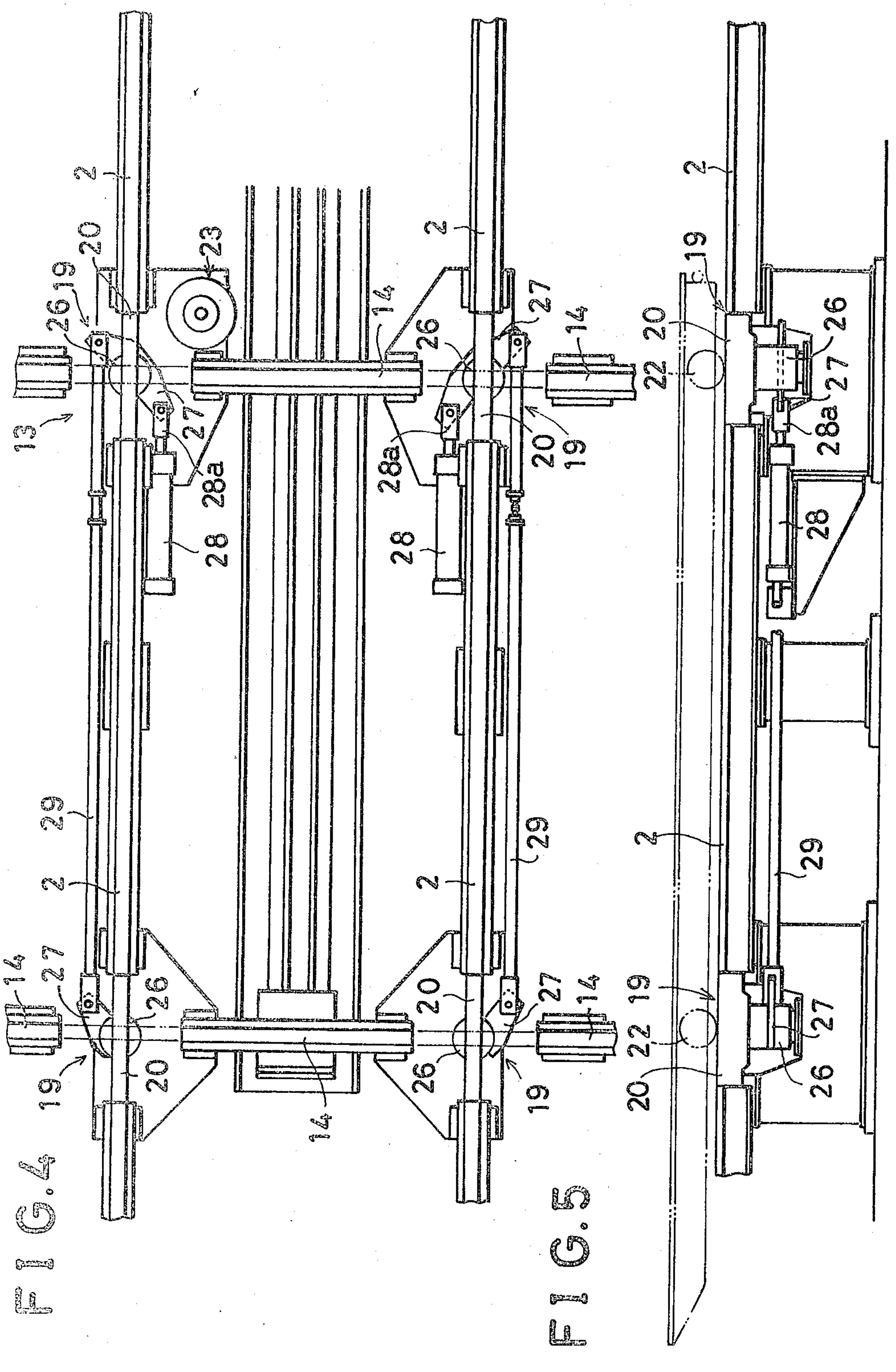
FIG. 4 is an enlarged top plan view of a portion thereof for showing a construction of a switch means.
FIG. 5 is a side view of FIG. 4.

One embodying example of this invention wherein this invention is applied to an automatic welding apparatus for welding a motorcar body, will be explained with reference to the accompanying drawings:

Referring to the drawings, a set carrier 1 for setting thereon a floor panel $W_1$ and a roof panel $W_2$ for a motor car body is arranged so as to run along a conveying railway comprising a pair of right and left conveying rails 2,2 extending between a set station A in rear and a combining station B in front. At the combining station B, there are provided plural lift means 3 for elevating and fixing the set carrier 1 at a desired height. Additionally, a pair of automatic welding apparatuses 5,5 are provided on both lateral outsides, that is, right and left outsides of the combining station A. Each of these is supported movably along on a pair of front and rear guide bars 4,4 extending laterally outwards from station B. The automatic welding apparatus 5 on each side includes a welding jig unit 8 detachably attached to a supporting frame 7. The supporting frame 7 also carries a plurality of transformers 6. The frame 7 includes a pair of front and rear supporting legs 9,9 provided on an outer surface of the jig unit 8 and a pair of front and rear cylinders 10,10 fixed to the supporting frame 7. The cylinders 10 have wedge members **10*a*,10*a* arranged to be in engagement with the foregoing legs 9,9. Additionally, the welding jig unit 8 on each side is provided on its inner surface with plural clampers 11 for clamping a side panel $W_3$ for the motorcar body, plural welding guns 12 for welding the foregoing floor panel, the roof panel and the side panel $W_1$, $W_2$ and $W_3$, and plural gripping arms 15 which will be explained in detail hereinafter. In FIG. 1, the clampers 11 and the welding guns 12** are not illustrated for brevity.

At the set station A, an exchanging railway is provided comprising a pair of front and rear exchanging rails 14,14 meeting at right angles, through a switch means 13, with the foregoing conveying rails 2,2.

Two exchanging carriers **18*a*,18*b* are provided on the exchanging rails 14,14. Each of these carriers 18*a*,18*b* is provided on both right and left sides thereof and through a supporting frame 17 thereof with plural gripping means 16 having gripping claws 16*a* arranged to be opened and closed by operation cylinders (not illustrated) for gripping the respective gripping arms 15 provided on the inner surface of the welding ji unit 8. One of the carriers 18*a* is in an unloaded condition and the other 18*b* thereof is ready to be in such a condition that another welding jig unit 8** to be exchanged is gripped thereon.

The foregoing switch means 13 may be constructed such that the rear end portions of the conveying rails 2,2, which extend in the set station A, are provided on a turn-table so as to be turnable thereby. However, this type of design is exceedingly large in size. Accordingly, in the illustrated example, the switch means 13, as shown clearly in FIGS. 4–9, comprises respective turnable rail portions 20 which are disposed at respective crossing positions 19. That is, four (front, rear, right and left) crossing positions 19 exist between the two conveying rails 2,2, and the two exchanging rails 14,14. The turnable rail portions 20 are fitted at these positions 19 and are arranged to be switchable by turning between the two railway directions. The switch means 13 is further provided with a rail fixing means 21 for fixing the respective turnable rail portions 20 in their respective switched positions, and a carrier fixing means 23 for positioning and fixing any of the foregoing carriers 1, **18*a*, 18*b* when the respective wheels 22** of the carrier are put on the respective corresponding turnable rail portions 20. Additionally, the respective wheels 22 of each of these carriers 1, 18*a*, 18*b* are supported on the carrier so as to be turnable about their respective vertical shafts 24 (FIG. 8).

Figure 8:
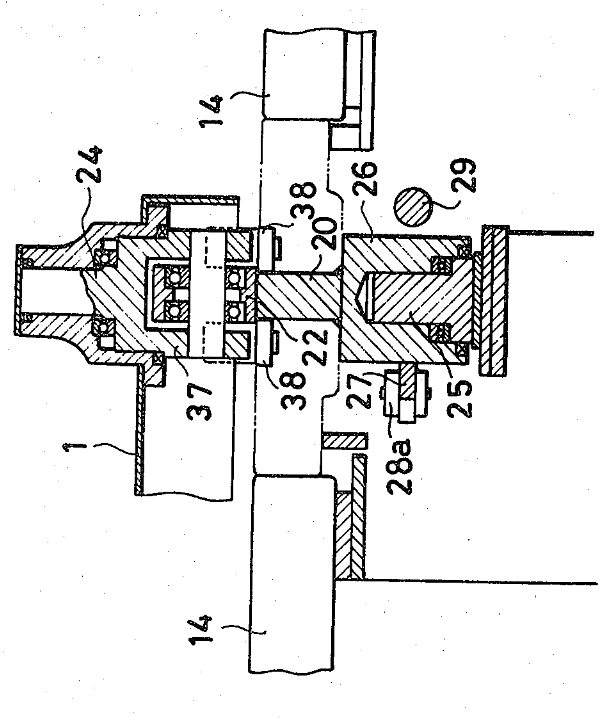

As shown clearly in more detail in FIG. 8, each turnable rail portion 20 is fixed upon a receiving member 26. Each receiving member 26 is mounted on an upright supporting shaft 25 provided below at the center of the crossing position 19 so as to be turnable about a fixed, vertical shaft 25. The receiving member 26 is provided with an operation plate 27 attached thereto. Each of the operation plates 27,27 at the right and left crossing positions 19,19 on the front side is connected to a piston rod 28*a* of a cylinder 28 as shown clearly in FIGS. 4–6. Each of the operation plates 27,27 at the right and left crossing positions 19,19 on the rear side is connected through a synchronizing bar 29 to each of the operation plates 27,27 on the front side. Thus, when the cylinders 28,28 are operated, the turnable rail portions 20,20 at the front and rear crossing positions 19,19 on each of the right and left sides can be turned to switch synchronously.

Figure 6:
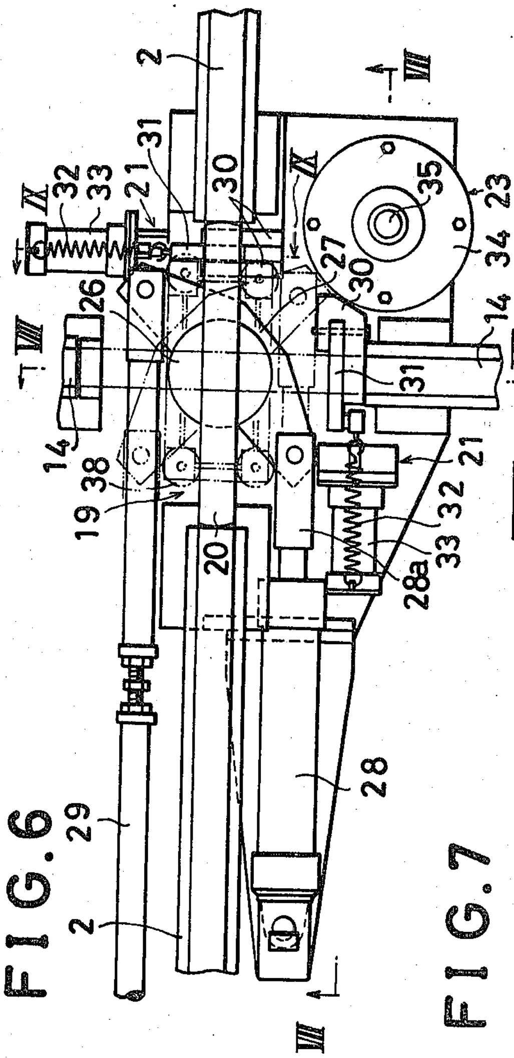
FIG. 6 is an enlarged top plan view of an important portion of the switch means.

As shown in FIG. 6, a pair of rail fixing means are provided at each of the front side crossing positions 19,19 on both the right and left sides to fix the turnable rail portions at the respective switched positions of the turn rail 20. As shown in detail in FIG. 9, each of the rail fixing means 21 comprises a rail stopper member 30 for receiving and stopping the incoming turnable rail portion 20 by turning and a rail lock member 31. The rail lock member 31 comprises an L-shaped member having at its upper surface a recess 31*a* in which the turn rail 20 is to be held. The L-shaped member 31 is pivotally supported at its one end portion on the rail stopper member 30 so as to be swingable upwards and downwards, and is pulled at its other end portion by a spring 32 so as to be kept in its upwardly moved position as shown by the solid lines. An unlocking cylinder 33 for releasing a locking condition is provided to face a side surface of the downward end portion of the lock member 31.

Figure 7:
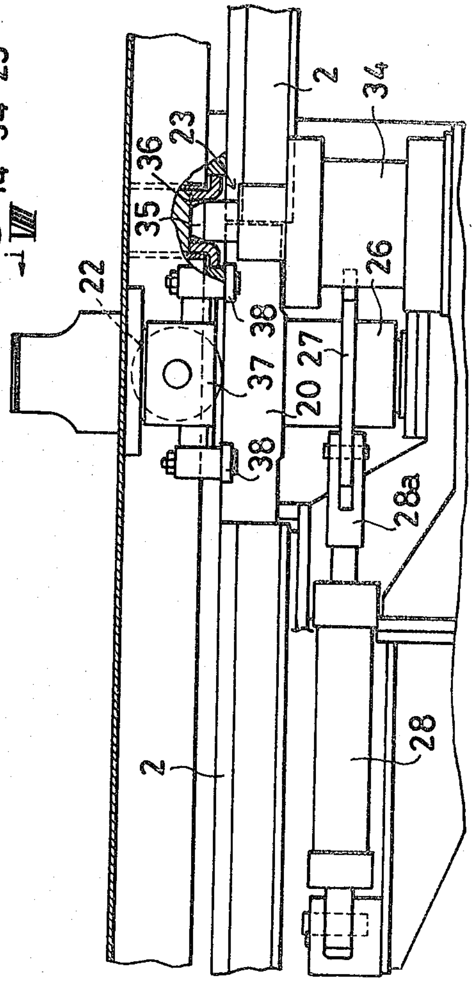
FIGS. 7 and 8 are sectional views taken along the lines VII—VII and VIII—VIII in FIG. 6.
Figure 9:
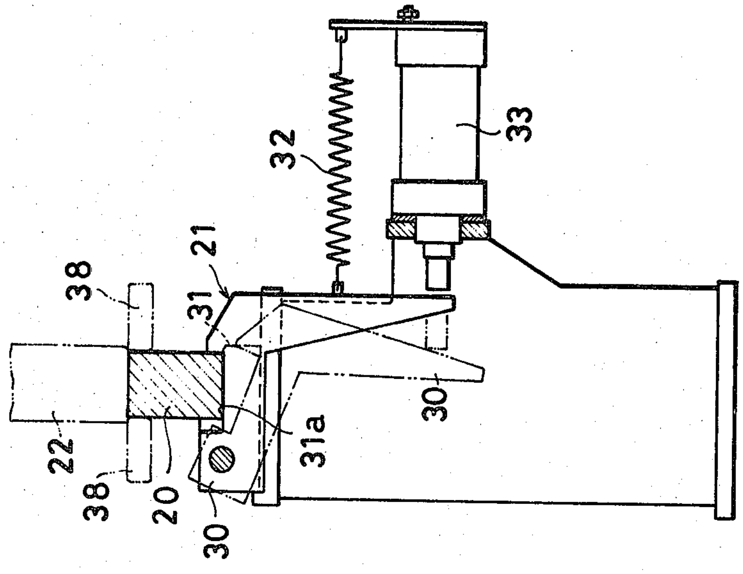
FIG. 9 is an enlarged sectional view taken along the line IX—IX in FIG. 6.

The carrier fixing means 23 comprises, as shown clearly in FIG. 7, a hydraulic cylinder 34 and an operation rod 35 provided thereon. The operation rod 35 can be moved by hydraulic pressure to engage in an opening 36 made in each of the carriers 1, 18*a*,18*b* to fixedly position the same.

As shown clearly in FIG. 8, each of the wheels 22 of each carrier is supported on a wheel holder member 37 provided turnably about the vertical shaft 24 so that the same may be turned about the vertical shaft 24. The holder member 37 has a pair of guide rollers 38 for holding the turnable rail portion 20 therebetween from both outsides thereof. Thus, the wheel 22 can be turned reliably in accordance with turning of the turnable rail portion 20.

Referring to FIG. 1, a pair of right and left guide rails 39,39 are installed between the conveying rails 2,2. A rack bar 41 having teeth on its bottom surface is provided between the guide rails 39,39 so as to be movable forwards and rearwards while it is supported on the pair of guide rails 39,39 through plural pairs of side wheels 40,40. The rack bar 41 is detachably connected to the forward end portion of each of the carriers 1, 18*a*, 18*b* through a connecting member 42. A wheel gear 44 is interposed between the rack bar 41 and a stationary rack bar 43 provided below the same. The wheel gear 44 is arranged to be reciprocated forwards and rearwards by an operation cylinder 45. Thus, by this reciprocal movement, each of the carriers 1, 18*a*, 18*b* can be reciprocated between the setting station A and the combining station B.

Next, the operation of this invention apparatus will be explained as follows:

For exchanging the welding jig units 8,8 of the automatic welding apparatus 5,5, the set carrier 1 at the set station A is switched by the action of the switch means 13 and is transferred from the conveying rails 2,2 to the exchanging rails 14,14. More in detail, the set carrier 1 is positioned at the set station A and fixed by the carrier fixing means 23. The respective turnable rail portions 20 are turned; thereby, each wheel 22 of the set carrier 1 is turned about its vertical shaft 24 because each wheel 22 is positioned on a turnable rail portion 20.

When each turnable rail portion 20 is about to reach the position wherein it is in alignment with the corresponding one of the exchanging rails 14,14, the turnable rail portion 20 pushes downwards the rail lock member 31 against the action of the spring 32 so as to ride onto the lock member 31. At this stage, the turnable rail portion 20 strikes against the rail stopper member 30 to be stopped. The rain portion 20 is fixedly held between the rail lock member 31 restored by the spring 32 and the rail stopper member 30. Under this condition, the carrier 1 is released from its locked condition locked by the fixing means 23 and is moved from the set station A to such portions of the exchanging rails 14,14 that extend in one lateral direction of the set station A.

Next, the exchanging carrier 18*a* in the unloaded condition which is waiting in readiness on such portions of the exchanging rails 14,14 that extend in the other lateral direction of the set station A is moved to the set station A. The carrier 18*a* is then switched to the conveying rails 2,2 by a reverse switching operation of the switch means 13 and thereafter is moved to the combining station B.

At this station B, the carrier 18*a* receives the welding jig units 8,8 from the welding apparatus 5,5. The carrier 18*a* is moved back to the set station A and is switched to the exchanging rails 14,14 by the operation of the switch means 13. It is moved to said one lateral side of the set station A together with carrier 1. At this stage, the exchanging carrier 18*b*, which is loaded with other welding jig units 8,8 for exchanging and is waiting in readiness on the other lateral side of setting station A, is conveyed to the set station A and is switched to the conveying rails 2,2 by the operation of the switch means 13. Thereafter, carrier 18*b* is conveyed to the combining station B, and at that station the welding jig units 8,8 are attached to the automatic welding apparatus 5,5. Thus, the exchanging operation is completed.

The carrier 18*b* is brought back to station B and is switched to exchange rails 14,14 by operation of the switching means 13. The carrier 18*b* is moved to said other lateral side and is reloaded with welding jig units 8,8. Carrier 18*a* is unloaded and moved across the crossing positions 19,19 to said other lateral side of station A. The unloading of carrier 18*a* and the reloading of carrier 18*b* can be done on either lateral side and at any convenient time. Carrier 1 is moved to the crossing positions 19,19 and is switched to the conveying rails 2,2 by operation of the switching means 13. The normal operation of the assembly line can thereafter proceed. The exchanging of welding jig units 8 as described above is carried out as often as is necessary.

Thus, according to this invention, the conveying railway for the set carrier is provided with the exchanging railway through the switch means, and at least two exchanging carriers, each having a gripping means for a welding jig unit, are provided on the exchanging rails so that an operation for exchanging of the welding jig unit can be achieved by an exchanging operation of these carriers. Thus, the exchanging operation at a narrow installation place can be very easily accomplished without using a fork lift, a crane or the like as used in the conventional case.

What is claimed:

1. An exchanging apparatus for a welding jig unit in combination with an automatic welding apparatus which includes a combining station for combining a work conveyed to this station by a set carrier, at least one automatic welding apparatus for welding the work at the combining station, the automatic welding apparatus having a welding jig unit which is detachable therefrom for exchanging, and a conveying railway for the set carrier, the exchanging apparatus comprising an exchanging railway which crosses the conveying railway through a switch means, and at least two exchanging carriers on the exchanging railway, each having thereon a gripping means for gripping a welding jig unit.

2. The combination as claimed in claim 1 wherein each of the set carrier and said at least two exchanging carriers is mounted on a plurality of wheels, each wheel being turnable about a vertical shaft fixed to the respective carrier; and the switch means comprises respective turnable rail portions which are disposed at respective crossing positions between respective rails of the conveying railway and the exchanging railway, said rail portions being arranged to be switchable by turning between the two railways; a rail fixing means for fixing the respective turnable rail portions at their switched positions; and a carrier fixing means for positioning and fixing any one of the set carriers and said at least two exchanging carriers when the respective wheels of the carrier are put on the respective corresponding turnable rails.

* * * * *